(12) United States Patent  
Thompson

(10) Patent No.: US 6,676,877 B2  
(45) Date of Patent: Jan. 13, 2004

(54) MOLD RUNNER FOR PREVENTION OF IN-MOLD COATING FLOW

(75) Inventor: John A. Thompson, Wooster, OH (US)

(73) Assignee: Omnova Solutions Inc., Fairlawn, OH (US)

( * ) Notice: Subject to any disclaimer, the term of this patent is extended or adjusted under 35 U.S.C. 154(b) by 0 days.

(21) Appl. No.: 10/116,069

(22) Filed: Apr. 3, 2002

(65) Prior Publication Data

US 2003/0190454 A1 Oct. 9, 2003

(51) Int. Cl.⁷ .............................................. B29C 45/16
(52) U.S. Cl. ..................... 264/255; 264/328.8; 425/130
(58) Field of Search ............................... 264/45.1, 46.4, 264/46.6, 46.9, 255, 129, 328.8; 425/130, 573

(56) References Cited

U.S. PATENT DOCUMENTS

| 4,076,788 A | 2/1978 | Ditto |
| 4,081,578 A | 3/1978 | Van Essen et al. |
| 4,189,517 A | 2/1980 | Shanoski et al. |
| 4,222,929 A | 9/1980 | Shanoski et al. |
| 4,316,869 A | 2/1982 | Van Gasse |
| 4,331,735 A | 5/1982 | Shanoski |
| 4,350,739 A | 9/1982 | Mohiuddin |
| 4,366,109 A | 12/1982 | Svoboda |
| 4,414,173 A | 11/1983 | Cobbledick et al. |
| 4,515,710 A | 5/1985 | Cobbledick |
| 4,668,460 A | 5/1987 | Ongena |
| 4,711,602 A | * 12/1987 | Baker ........................ 425/206 |
| 4,783,298 A | * 11/1988 | Oda ........................... 264/255 |
| 4,798,697 A | 1/1989 | Nohara et al. |
| 4,840,553 A | * 6/1989 | Arai ........................... 264/255 |
| 4,921,669 A | 5/1990 | Vetter et al. |
| 4,931,234 A | * 6/1990 | Schad et al. ................ 264/255 |
| 4,950,154 A | 8/1990 | Moberg |
| 4,963,312 A | 10/1990 | Müller |
| 5,053,177 A | 10/1991 | Vetter et al. |
| 5,084,353 A | 1/1992 | Cobbledick et al. |
| 5,132,052 A | 7/1992 | Cobbledick et al. |
| 5,359,002 A | 10/1994 | Cobbledick et al. |
| 5,391,399 A | 2/1995 | Cobbledick et al. |
| 5,496,509 A | 3/1996 | Yamamoto et al. |
| 5,562,979 A | 10/1996 | Easterlow et al. |
| 5,614,581 A | 3/1997 | Cobbledick et al. |
| 5,632,949 A | 5/1997 | Fisher et al. |
| 5,639,403 A | 6/1997 | Ida et al. |
| 5,658,672 A | 8/1997 | Lenke et al. |

(List continued on next page.)

FOREIGN PATENT DOCUMENTS

WO PCT/CA01/00534 4/2001

OTHER PUBLICATIONS

The Sabreen Group, Inc.'s "Preparing Plastics for Painting" article.
Chlorocarbons and Chlorohydrocarbons–$C_2$ to Combustion Technology, Kirk–Othmer *Encyclopedia of Chemical Technology*, Fourth Edition, vol. 6, (1983), pp. 676–690.
GE Plastics Processing Guide, *GE Engineering Thermoplastics Injection Molding Processing Guide*, General Electric, 1998, pp. i–iv.

(List continued on next page.)

*Primary Examiner*—Jill L. Heitbrink
(74) *Attorney, Agent, or Firm*—Fay, Sharpe, Fagan, Minnich & McKee; David G. Burleson

(57) ABSTRACT

A mold runner for a runner or sprue type injection molding apparatus. The mold runner allows the passage of a substrate material from an injection source into a mold cavity and contains a containment shroud which utilizes the relative incompressibility of the substrate material in the containment shroud which prevents an in-mold coating, which is injected into the mold cavity in a subsequent step, from flowing into the injection substrate source thereby contaminating the same.

8 Claims, 3 Drawing Sheets

U.S. PATENT DOCUMENTS

| | | | |
|---|---|---|---|
| 5,736,090 | A | 4/1998 | Yamamoto et al. |
| 5,777,053 | A | 7/1998 | McBain et al. |
| 5,882,559 | A | 3/1999 | Eckardt et al. |
| 5,902,534 | A | 5/1999 | Fujishiro et al. |
| 5,906,788 | A | 5/1999 | Boeckler |
| 5,925,386 | A | 7/1999 | Moberg |
| 6,174,158 | B1 | 1/2001 | Seres, Jr. et al. |
| 6,180,043 | B1 | 1/2001 | Yonemochi et al. |
| 6,261,075 | B1 * | 7/2001 | Lee et al. ............... 425/130 |
| 6,287,488 | B1 | 9/2001 | Dougherty et al. |
| 6,409,955 | B1 * | 6/2002 | Schmitt et al. .......... 264/297.2 |

OTHER PUBLICATIONS

GE Injection Molding Mold Design, *GE Engineering Thermoplastics Injection Molding Processing Guide*, General Electric, 1998, pp. 1–1–1–24.

GE Injection Molding Processing, *GE Engineering Thermoplastics Injection Molding Processing Guide*, General Electric, 1998, pp.2–1–2–12.

GE Injection Molding Troubleshooting Guide, *GE Engineering Thermoplastics Injection Molding Processing Guide*, General Electric, 1998, pp. 3–1–3–7.

Long Fiber Reinforced Thermoplastics, *Injection Molding Guide*, Celstran, 1999, pp. 1–27.

U.S. patent application Ser. No. 60/198,691, Mike Brett, filed Apr. 20, 2001.

\* cited by examiner

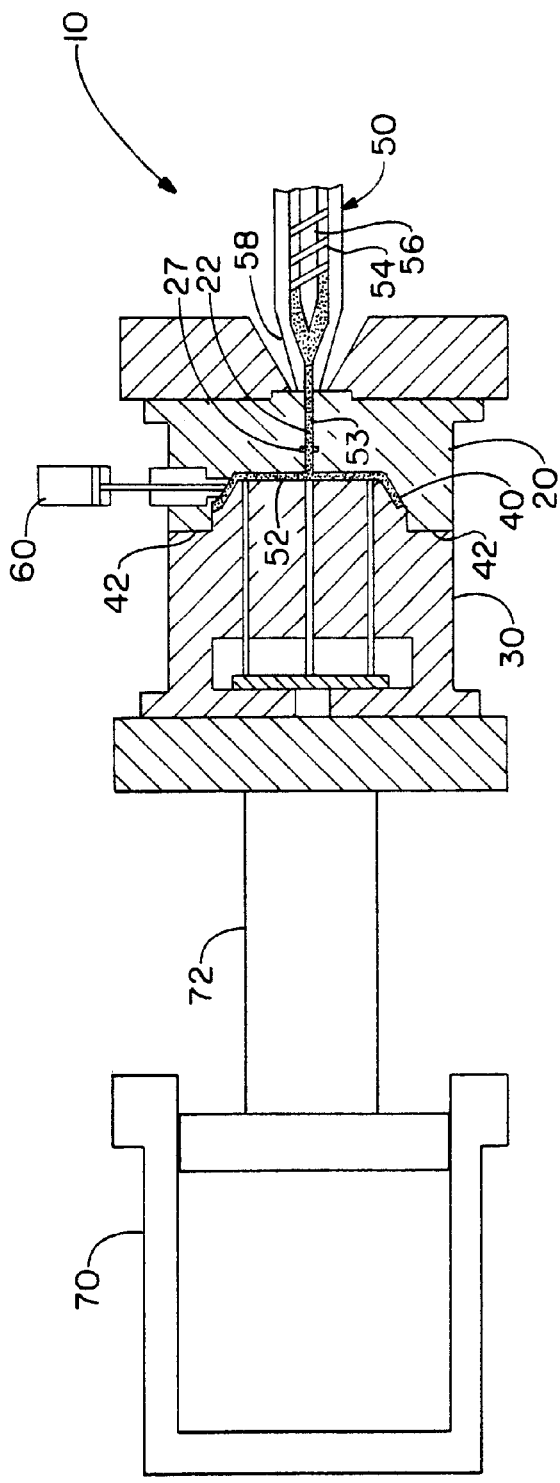
FIG.-1
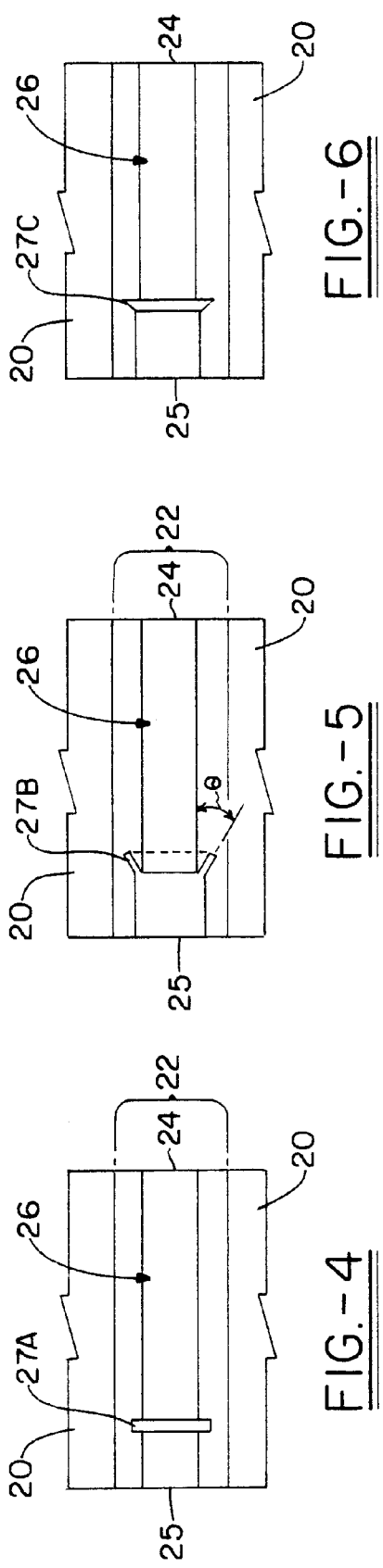
FIG.-4
FIG.-5
FIG.-6

MOLD RUNNER FOR PREVENTION OF IN-MOLD COATING FLOW

FIELD OF THE INVENTION

The present invention relates to a mold runner for a runner or sprue type injection molding apparatus. The mold runner allows passage of a melted, flowable substrate from an injection source into a mold cavity while preventing an in-mold coating, which is injected into the mold cavity in a subsequent step, from flowing into the injection source thereby contaminating the same. Accordingly, the mold runner is a barrier to in-mold coating flow.

BACKGROUND OF THE INVENTION

It is often desirable to provide a molded substrate with a coating while the substrate still resides in a mold cavity after an injection molding operation has been performed. Various methods of in-mold coating have been utilized in order to improve the quality of a surface of molded products wherein the coated product is suitable for use "as is" in an end use application, or which would require less or no surface preparation treatment than heretofore utilized.

The application of in-mold coatings (IMC) to thermoplastic or thermoset materials to provide generally smooth surfaces, improve durability and other surface properties, and to reduce or eliminate substrate porosity is known. A number of in-mold coating methods have been employed for applying coatings, in compression molding methods or injection molding methods employing molding materials of thermosetting resins, such as SMC (sheet molding compound) and BMC (bulk molding compound) (e.g., U.S. Pat. Nos. 4,076,788; 4,081,578; 4,331,735; 4,366,109; 4,668,460 and 6,180,043).

During an injection molding process wherein a substrate is coated with an in-mold coating, a substrate in a melted condition is injected into a mold cavity through a mold runner in a platen between a mold cavity and an injection device. After the injection of the substrate, the injected substrate is allowed to cool and set. At this point in the process the substrate is still connected to a sprue or sprue bushing which is formed between the substrate in the mold cavity and the nozzle of the injection device, i.e. in the mold runner of the platen.

When the molded substrate has cooled sufficiently to accept an in-mold coating, the same is injected from an in-mold coating injection device onto the surface of the substrate. The in-mold coating spreads out from the point of injection and covers a predetermined surface of the substrate. As the in-mold coating is injected into the mold cavity high pressure, usually about 200, 500, or 1000 to about 5000 psi, the in-mold coating spreads out upon the surface of the molded substrate.

Typically, the in-mold coating is injected onto the same surface of the substrate on which the sprue or sprue bushing is present. Accordingly, the in-mold coating not only spreads out across the intended surface of the substrate, but also along the exterior portion of the sprue. Through the sprue, the in-mold coating can gain entrance to the injection molding device through the nozzle of other orifice thereof. The flow of in-mold coating into the injection molding device contaminates the same by its breeching action. The cross contamination between the uncured in-molding coating and melted substrate resin can produce substandard parts. It would therefore be desirable to provide an apparatus that prevents the in-mold coating from gaining entrance to and contaminating a substrate injection molding device.

SUMMARY OF THE INVENTION

The present invention is directed toward an improved mold runner particularly for use in injecting a melted polymeric substrate material into a mold. The mold runner receives substrate material above its melting point from an injection molding machine and provides a passageway for transferring the material into a mold cavity. The mold runner includes novel structure designed to prevent an in-mold coating from entering the nozzle or other orifice of the injection molding machine from the mold cavity. The mold runner thus provides an effective barrier to in-mold coating flow.

In a preferred embodiment, the mold runner has a body member which is either formed in or insertably connected to a mold half. The body member has first and second ends and a fluid passageway therebetween. The first end receives melted substrate material from the injection molding machine and the second end is an outlet for discharging the substrate material into the mold cavity. An in-mold coating containment shroud is situated in the mold runner passageway to prevent an in-mold coating from entering the injection molding, machine through an orifice thereof.

The mold runner passageway has a shape which is generally conical or cylindrical, except in the region of the containment shroud. The containment shroud is generally a projection or cavity which extends radially outward about the mold runner passageway. The angle of the containment shroud with respect to the mold runner passageway can vary.

BRIEF DESCRIPTION OF THE DRAWINGS

The invention will be better understood and other features and advantages will become apparent by reading the detailed description of the invention, taken together with the drawings, wherein:

FIG. 1 is a partial schematic view of a molding apparatus capable of in-mold coating a molded substrate. The molding apparatus incorporates a mold runner of the present invention.

FIG. 4 is a schematic view of a preferred embodiment of a mold runner in a mold half.

FIG. 5 is a schematic view of a further embodiment of a mold runner containing a containment shroud according to the present invention.

FIG. 6 is yet another schematic view of an alternative embodiment of a mold runner containing a containment shroud.

DETAILED DESCRIPTION OF THE INVENTION

Figure 4A:
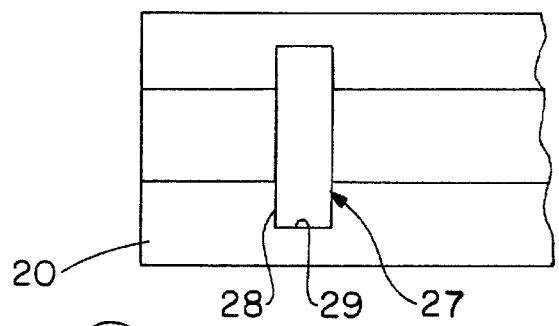
FIG. 4(a) is a close up view of the containment shroud illustrated in FIG. 4.

The embodiments of the mold runner and associated apparatus according to the present invention will be specifically described, with reference to the drawings wherein numerals indicate like or corresponding parts throughout the several figures. In FIG. 1, there is shown a schematic view of an injection molding and in-mold coating apparatus, which is generally identified by the numeral 10. The embodiments of the present invention can generally be practiced on any molding apparatus such as injection molders capable of producing a molded article or substrate of a first composition and then coating the article or substrate with a second composition, i.e. an in-mold coating.

Molding apparatus 10 includes a first mold half 20 which preferably remains in a stationary or fixed position relative to a second moveable mold half 30. FIG. 1 shows the mold halves in closed position. The first mold half and second mold half are adapted to mate, or abut, thereby forming a mold cavity 40 therebetween as shown. The mold halves mate when the molding apparatus is in the closed position, forming a parting line 42 therebetween.

The moveable mold half 30 reciprocates generally along a horizontal axis relative to the first or fixed mold half 20 by action of a clamping mechanism 70 with a clamp actuator 72 such as through a hydraulic, mechanical, or electrical actuator as known in the art. The clamping pressure exerted by the clamping mechanism 70 should have an operating pressure in excess of the pressures generated or exerted by the thermoplastic or thermoset substrate composition injector apparatus 50 and the in-mold coating injector 60. The pressure exerted by the clamping mechanism ranges generally from about 2,000 to about 15,000, desirably from about 4,000 to about 12,000, and preferably from about 6,000 to about 10,000 pounds per square inch (psi) of mold surface.

As shown in FIG. 1, the first composition injector 50 is a typical injection molding apparatus which is well know to those of ordinary skill in the art and is capable of injecting a thermoplastic or thermosetting composition, generally a resin or polymer, into the mold cavity. The composition injector 50 is shown contacting mold half 20 so that nozzle or resin outlet 58 mates with mold half 20 and can inject into mold cavity 40 through mold runner 22. For purposes of illustration only, the first composition injector in FIG. 1 is a reciprocating-screw machine wherein a first composition can be placed in a hopper and rotating screw 56 moves the composition through the heated extruder barrel 54, wherein the material is heated above its melting point. As the material collects in the end of the barrel during a molding cycle, the screw acts as an injection ram and forces it through the nozzle 58 into the mold cavity 40.

The first composition injector is not meant to be limited to the embodiment shown in FIG. 1 but can be any apparatus capable of injecting a thermoplastic composition into the mold cavity.

Suitable injection molding machines are available from Cincinnati-Milacron, Battenfeld, Engel, Husky, Boy and others.

Figure 2:
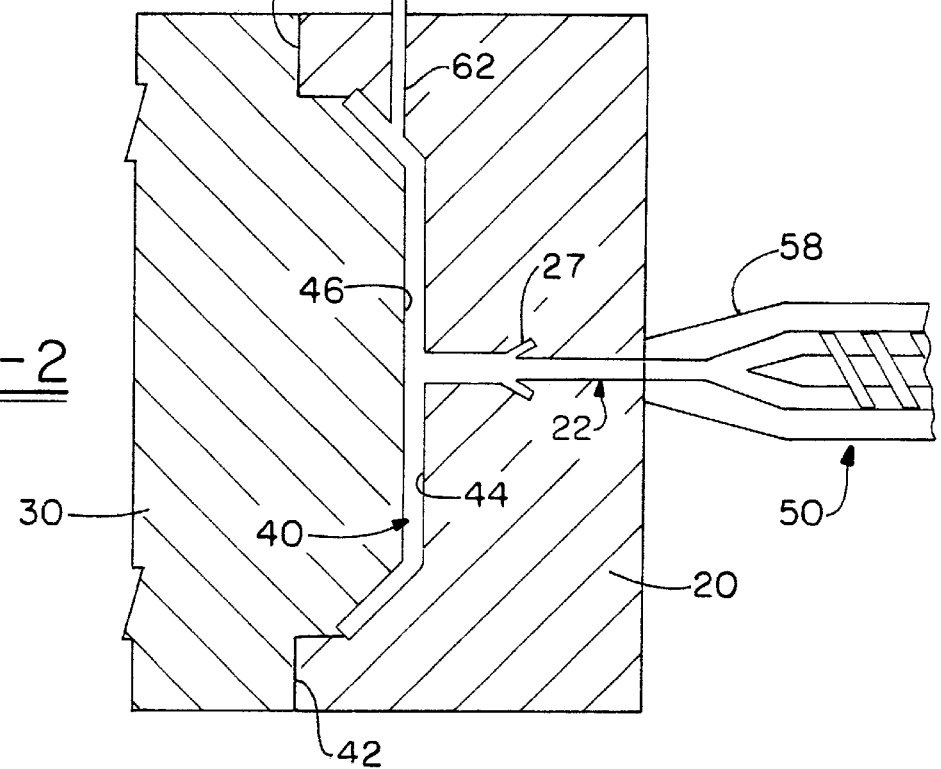
FIG. 2 is a schematic view of a mold cavity having a mold runner and an in-mold coating inlet.

In FIG. 2, the mold halves 20 and 30 are shown in a closed position, abutted or mated along parting line 42. As illustrated, the mold cavity 40 is shown in cross section. It is readily understood by those skilled in the art that the design of the cavity can vary greatly in size and shape according to the end product to be molded. The mold cavity generally has a first surface 44 on the first mold half, upon which a show surface of an article will be formed, and a corresponding back side or opposite second surface 46 on the second mold half. The mold cavity also contains separate orifices, i.e. mold runner 22 and in-molding coating inlet 62 to allow the composition injectors respectively to inject their respective compositions thereinto. The location of the injectors and injection orifices thereof can vary from apparatus to apparatus, and part to part, and can be based on factors such as efficiency, functionality, or desire of the mold designer.

Figure 3:
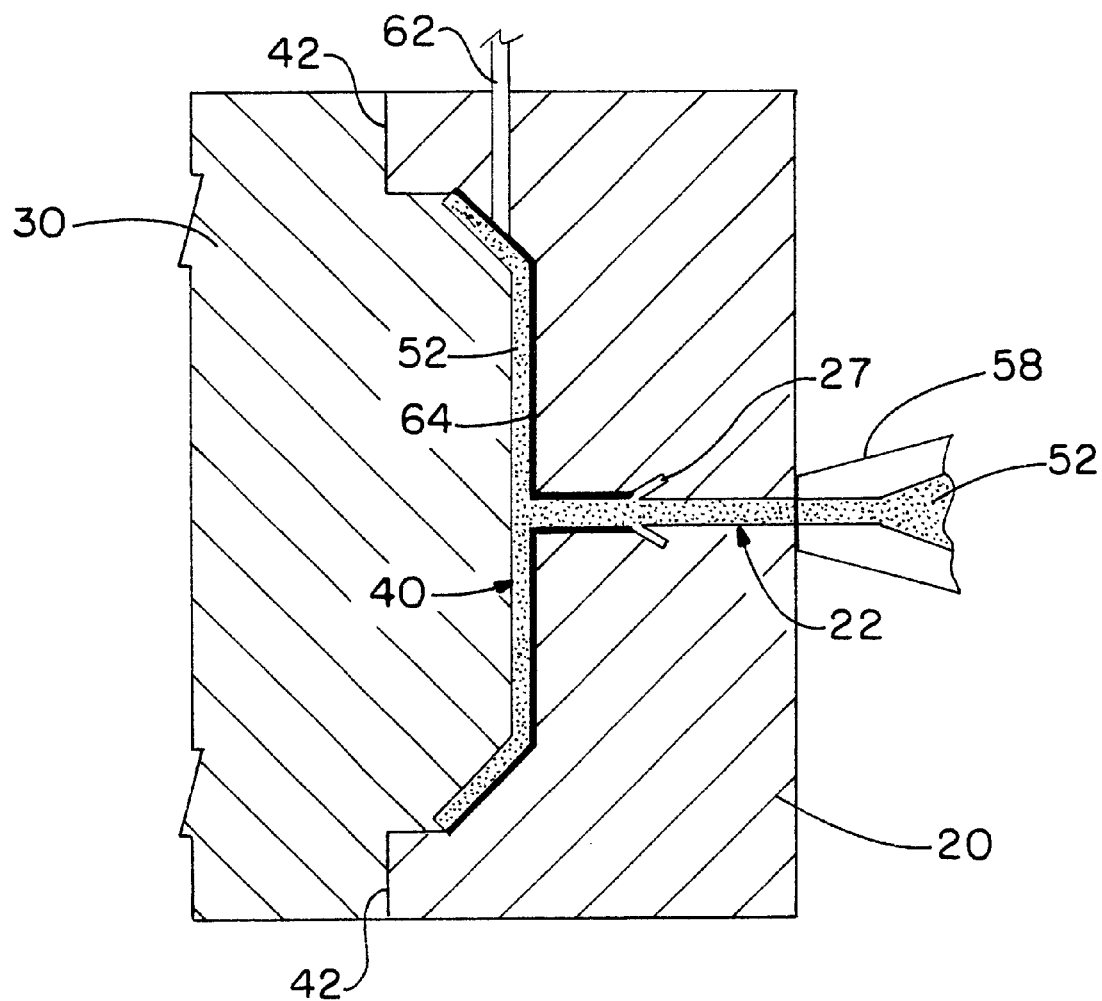
FIG. 3 is a schematic view of the mold cavity as shown in FIG. 2 wherein the mold cavity has been filled with a substrate composition and an in-mold coating has been applied thereto. The mold runner having a containment shroud has prevented the coating from entering the substrate injector.

As shown in at least FIGS. 1 and 2, mold runner 22 provides a passageway in the mold half for transferring a substrate composition from an injection apparatus 50 into the mold cavity 40. In the art, the mold runner may also be referred to as a sprue bushing, or a mold runner drop, etc. FIG. 4 illustrates a schematic view of one embodiment for the inventive mold runner 22 of the present invention. Mold runner 22 has a body member which can be separate from or integral with a mold half or platen. That is, the mold runner can be a separate, removable, and distinct member inserted in and attached to a mold half or can be formed or shaped into a mold half itself. The mold runner has a first end 24 and a second end 25. A passageway 26 extends between the first and second ends. As shown in at least FIGS. 2 and 3, the first end receives melted material from the injection molding machine and the second end discharges the material into the mold cavity 40, with the material subsequently forming a substrate in the mold cavity which can be coated with an in-mold coating. The passageway 26, except in the region of the containment shroud, as illustrated in FIG. 3 is generally cylindrical in cross section. Other suitable passageway shapes, include but are not limited to, conical, helical, and tapered, etc. Most mold runners used in industry are cylindrical as they avoid placing stress, strain, and shear forces on the substrate during injection. As shown in at least FIG. 1, the nozzle 58 is positioned or seated at the mold runner first end for a molding operation.

The mold runner includes containment shroud 27 which prevents an in-mold coating from flowing or terminates in-mold coating flow through passageway 26 and into the molding apparatus 50 or out of the space between mold half 20 about first end 24 and injection apparatus 50 about nozzle 58.

The containment shroud is generally a recess, hollow, or void, which extends around the entire perimeter or circumference of at least one portion of the mold runner passageway between the first end and second end. In other words, the containment shroud is generally a cavity, formed in the mold runner about a peripheral segment of the passageway generally on a plane substantially perpendicular to the passageway axis. Each containment shroud has a base portion and a terminal or end portion as at least shown in FIG. 4(a) as 28 and 29 respectively. The base portion 28 has a predetermined width along an axial length of the passageway. The containment shroud also has a height and extends for a distance generally radially outward from the passageway perimeter.

As noted above, the containment shroud has a design or structure effective to prevent or terminate an in-mold coating from passing therearound or therethrough from the passageway egress to the passageway substrate material entrance. After the substrate composition has been injected into the mold cavity, the mold runner and containment shroud are also filled with the substrate composition. The substrate composition filled containment shroud utilizes the relative incompressibility of the substrate in this thin area as a barrier to prevent in-mold coating flow. In a preferred embodiment, the base portion has a width or thickness greater than or equal to the terminal portion, such as shown in FIGS. 5 and 6 in order to allow substantially effortless removal of the partially coated substrate sprue including a projection formed in the containment shroud. The width of the base portion can vary but generally ranges from about 0.001 in.

(0.0254 mm) to about 0.25 in. (6.35 mm), and preferably from about 0.0025 in. (0.0635 mm) or 0.005 in. (0.127 mm) to about 0.015 in. (0.381 mm). Accordingly, the terminal or radially outward portions of the containment shroud often has a width less than the base portion. The height of the containment shroud between the base portion and the terminal portion can vary but is generally from about 0.005 in. (0.127 mm) to about 0.50 in. (12.7 mm) or 0.75 in. (19.05 mm), desirably from about 0.008 in. (0.2032 mm) to about 0.025 in. (0.635 mm), and preferably from about 0.010 in. (0.254 mm) to about 0.015 in. (0.381 mm). The containment shroud can be located anywhere along the mold runner passageway between the first and second ends. Preferably the containment shroud is located towards the second end where the in-mold coating can enter the mold runner. The containment shroud can be located as close as about 0.010 inches (0.254 mm) to the second end. The shroud design is dependant on numerous factors such as the diameter of the runner and substrate composition wherein the shroud area is needed for high modulus, less compressible substrates.

In the embodiment of FIG. 4, the containment shroud 27A is shown as an annular ring having a plane perpendicular to the axis formed by the passageway between first and second ends 24 and 25. The annular ring has squared off corners at the end portion thereof. FIG. 5 shows a further embodiment of a containment shroud of the present invention. The containment shroud 27B is set at an angle so that the sprue formed by the substrate which fills the passageway and containment shroud can be easily removed from the mold runner after a molding and coating operation is performed and the coated part is removed from the mold. The containment shroud is generally set at an angle θ measured from an axis formed by the passageway and height measured from the base portion to the terminal portion. The angle θ may vary from about 1° to about 90°, desirably from about 25° to about 65°, and preferably from about 40° to about 55°. As further shown in FIG. 5, in order to make the screw easily removable, the passageway between the containment shroud and second end 25 has a diameter greater than that of the passageway between the containment shroud and first end 24. Thus, when the sprue is pulled out of the mold in the direction of the mold cavity, the containment shroud is flexible or bendable and conforms to the diametrical space provided in the passageway nearest the second end. The containment shroud can also have an embodiment such as a taper or wedge 27C as shown in FIG. 6.

It is important to note that the containment shroud is not meant to be limited to the embodiments specifically illustrated in the drawings of the present invention and one of ordinary skill in the art would understand the modifications and variations possible.

Figure 7:
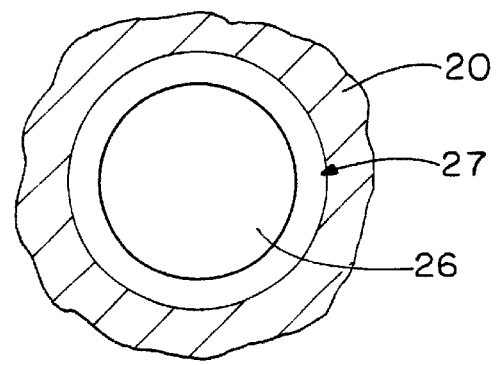
FIG. 7 is a cross section through a mold half at a vertical section where a mold runner containment shroud is present. Therein, the peripheral nature of the containment shroud about the perimeter of the mold runner is shown.

FIG. 7 illustrates a cross section through a vertical axis of a mold half at a location where the containment shroud is present such as in FIG. 4. As can be seen therein, containment shroud 27 extends completely around the perimeter of passageway 26 in order to prevent the in-mold coating from flowing through the mold runner. In this embodiment, the mold runner is of a cylindrical shape and therefore the containment shroud extends radially around the passageway perimeter.

In order to understand how the mold runner of the present invention functions, the following description of an in-mold coating process is described, with reference made to the drawings. The in-mold coating of substrates is well known in the art, and it is to be understood that variations of the process not described herein are to be included within the parameters of the present invention. A thermoplastic or thermosetting substrate material is introduced into an injection molding apparatus 50 wherein the material is heated above its melting point. The substrate material is moved through the apparatus utilizing rotating screw 56 and is deposited at the end of the barrel. During a molding cycle, the mold halves 20 and 30 are brought together in a closed position as shown in FIG. 1 and the melted substrate material is injected from nozzle 58 of the injection molding apparatus through mold runner 22 into the mold cavity 40. Generally, an appropriate amount of substrate material is injected into the mold cavity so that a final product desirably fills the mold cavity. As shown in FIG. 1, the substrate material takes the shape of the mold cavity and also includes a sprue portion 53 which resides in mold runner 22, generally conforming to the shape thereof and completely filling the same. Once the substrate material has been injected into the mold cavity, the same begins to cool and solidify. At some point, the substrate material solidifies, or achieves surface properties wherein an in-mold coating can be applied thereto. An in-mold coating is injected into mold cavity 40 onto a show surface of the substrate material. As shown in FIG. 2, the in-mold coating injector 60 will inject a composition onto the show surface side 44 of a substrate. Through pressure, the in-mold coating will spread from in-mold coating inlet 62 across the show surface of the substrate. Inasmuch as the in-mold coating is injected onto the same side of the substrate material as sprue 53 and mold runner 22, the in-mold coating will flow along the sprue 53 towards the injection apparatus 50.

As stated in U.S. Pat. Ser. No. 10/045,481, and herein incorporated by reference, it has been found that each substrate composition has a compressibility and thus a compressibility factor or percentage, wherein at a given temperature a specific substrate is compressible to a certain degree. Therefore, even though a molded article or substrate has a single compressibility ratio, a first area of a substrate which is thicker relative to a second area of a substrate will be able to compress a greater thickness or distance than the second substrate. For example, substrate (a) has a compressibility ratio of 20% at a certain temperature. Therefore, a portion of substrate (a) which has a thickness of 2.0 centimeters can compress 0.4 centimeters, whereas a portion of the substrate which has a thickness of 1.0 centimeters can only compress 0.2 centimeters at the given temperature. The mold runners of the present invention have been designed to utilize substrate compressibility inherently to prevent an in-mold coating from reaching a molding apparatus and contaminating the same.

FIG. 3 illustrates an in-mold coated substrate in a mold cavity wherein the containment shroud of the present invention has been utilized to prevent the in-mold coating from flowing through the mold runner.

The uncured in-mold coating spreads out across the surface of the substrate to be coated and also enters second end 25 of the mold runner 22. The coating will travel up the sprue from the second end to the first end 24 of the mold runner due to the compressibility of the sprue material. Once the in-mold coating encounters the containment shroud 27, the coating is stopped from any further travel by the design of the containment shroud. Coating flow around the containment shroud is prevented by the relative incompressibility of the substrate composition in the containment shroud. Thus, the in-mold coating is prevented from entering the injection apparatus 50 and contaminating the substrate material therein.

After the in-mold coating has been injected into the mold cavity, the same will cure and adhere to the substrate material. Afterwards, the fixed mold halves can be parted and the coated substrate material removed along with sprue 53, which contains a rim or projection formed by the mold runner containment shroud. The sprue is easily removable from the mold runner as the projection formed in the containment shroud is generally flexible. Further coated substrates can be produced since the in-mold coating has not contaminated the injection apparatus due to the presence of the runner having a containment shroud of the present invention.

Any thermoplastic substrate can be utilized in conjunction with the mold runner of the present invention. Suitable thermoplastic substrates include, but are not limited to polyethylene terephthalate (PET), nylon, acrylonitrile butadiene styrene (ABS), polystyrene, polycarbonate, acrylic, acetal, polyolefins such as polyethylene and polyethylene, polypropylene, and polyvinyl chloride (PVC). The foregoing list is not meant to be exhaustive but only illustrative of the various materials useful in the practice of the invention.

The mold runner of the present invention can be utilized with any in-mold coating, many of which are available commercially. Such coatings include GenGlaze® and Stylecoat®, acrylic based appearance in-mold coatings available from Omnova Solutions Inc. of Fairlawn, Ohio, as well as others. These and other coatings are well known to the art. In-mold coating injection devices are available commercially from $EMC^2$ of Sterling Hills, Mich., and Morrell of Auburn Hills, Mich.

Suitable in-mold coatings are found in U.S. Pat. No. 5,777,053, herein incorporated by reference. The main advantage of acrylic coatings is the high degree of resistance to thermal and photoxidation and to hydrolysis, giving coatings that have superior color retention, resistance to embrittlement and exterior durability. Low-molecular weight acrylic resins having an average functionality of two to three and containing few molecules that are nonfunctional or only monofunctional, are useful in the present invention. Epoxy resins are also useful as in-mold coatings in the present invention. A principal use of epoxy resins is as a component in two-package primer coatings. One part contains the epoxy resin and the other part contains a polyfunctional amine. Amine-terminated polyamides, sometimes called amido-amines, are widely used. A preferred acrylic resin is an epoxy-based oligomer having at least two acrylate groups and at least one copolymerizable ethylenically unsaturated monomer, and at least one copolymerizable monoethylenically unsaturated compounds having a —CO—, group and a —$NH_2$—, NH, and or —OH— group.

The present invention also contemplates the use of other resin coatings, such as alkyds, polyesters, urethane systems, amino resins, phenolic resins, and silicone resins. See e.g., Kirk Othmer, Encyclopedia of Chemical Technology, Vol. 6 ($4^{th}$ ed. 1993) at pp. 676–690.

In-mold coatings comprising five components, namely
1) a saturated aliphatic polyester intermediate urethane
2) an aliphatic polyether
3) an aliphatic or cycloaliphatic portion (meth)acrylate
4) hydroxy alkyl (meth)acrylates
5) vinyl substituted aromatics have been found to have particular utility in the practice of this invention. Such in-mold coating compositions are prepared as follows. The polyester urethane acrylate is mixed with the vinyl substituted aromatic monomers such as styrene, the saturated aliphatic or cycloaliphatic (meth) acrylates such as isobornyl acrylate, and the hydroxyalkyl methacrylate, such as hydroxypropyl methacrylate. After these compounds are mixed, fillers and additives, such as cure inhibitors, light stabilizers, lubricants, etc., are added and mixed. The free radical generating initiator is added last. The polyacrylate ester of a polyol can be present in the polyester urethane acrylate from the supplier. This in-mold coating composition is clear after curing.

Any of the coatings contemplated for use in the present invention can be colored by utilizing a pigment, a colorant, etc., in a desired or effective amount to yield a desired color, tint, hue, or opacity. Pigments, pigment dispersions, colorants, etc. are well known to the art and include, for example, graphite, titanium dioxide, carbon black, phthalocyanine blue, phthalocyanine red, chromium and ferric oxides, aluminum or other metal flake, and the like.

When an in-mold coating having a specific color is desired, one or more pigments, colorants, etc., can be utilized in suitable amounts. As known to the art, often times various pigments or colorants are added with a carrier, for example, a polyester, so that they can be easily blended. Any suitable mixing vessel can be utilized, and the various components and additives mixed until the compounds are blended.

All of the above-described in-mold coating compositions that may be utilized in the present invention may contain other additives and fillers, etc., in amounts known to the art. For example, various cure inhibitors such as benzoquinone, hydroquinone, methoxyhydroquinone, p-t-butylcatechol, and the like, can also be utilized. Other additives may include an accelerator, such as cobalt octoate. Other classes of accelerators include zinc, or other metal carboxylates. Various light stabilizers can also be utilized such as, for example, the various hindered amines (HALS), substituted benzophenones, and substituted benztriazoles, and the like.

Lubricants and mold release agents are generally utilized with specific examples including various metal stearates, such as zinc stearate or calcium stearate or phosphonic acid esters. Reinforcing fillers, such as talc, can be utilized. Other additives include hardeners, thixotropes, such as silica, and adhesion agents, such as polyvinyl acetate.

It is important to note that the mold runner of the present invention can be utilized on generally any injection molding apparatus wherein a substrate composition is injected into a mold cavity and a mold runner can be placed therebetween. A mold runner of the present invention offers beneficial savings in labor and expenditures as the in-mold coating is prevented from contaminating a substrate injection source.

In accordance with the patent statutes, the best mode and preferred embodiment have been set forth, the scope of the invention is not limited thereto, but rather by the scope of the attached claims.

What is claimed is:

1. A method for preventing in-mold coating flow from entering a substrate injection device, said method comprising the steps of:

injecting a substrate composition above its melting point into a mold cavity through a mold half comprising a mold runner thereby forming a molded article in said mold cavity and a sprue connected to said molded article in said mold runner, said mold runner having a passageway with a first end and a second end and a containment shroud located along said passageway of said mold runner between said first end and said second end spaced a distance from said first end and said second end, said containment shroud being a cavity extending outwardly around the perimeter of the passageway and also filled with said substrate composition; and injecting an in-mold coating onto a surface of said molded article in said mold cavity, said in-mold coating being prevented by said containment shroud from flowing completely through said passageway and into said substrate injection device.

2. A method according to claim 1, wherein said passageway is substantially cylindrical, substantially conical, or substantially tapered.

3. A method according to claim 2, wherein said containment shroud is a cavity which has a base portion connected to said passageway perimeter, and wherein said base portion has a width.

4. A method according to claim 3, wherein said containment shroud has a terminal portion opposite said base portion and a height therebetween, and wherein the terminal portion has a width which is less than or equal to the width of said base portion.

5. A method according to claim 4, wherein said containment shroud is formed at an angle of about 1° to about 90° in relation to an axis in the passageway between a first end and a second end.

6. A method according to claim 5, wherein said angle is about 35° to about 55°.

7. A mold runner according to claim 1, wherein a volume of the mold cavity remains substantially the same in both the steps of injecting a substrate composition into the mold cavity and injecting the in-mold coating onto the surface of the molded article in the mold cavity.

8. A method for preventing in-mold coating flow from entering a substrate injection device, said method comprising the steps of:

injecting a substrate composition above is melting point into a mold cavity through a mold half comprising a mold runner thereby forming a molded article in said mold cavity and a sprue connected to said molded article in said mold runner, said mold runner having a passageway with a first end and a second end and a containment shroud located along said passageway of said mold runner between said first end and said second end spaced a distance from at least one of said first end and said second end, said containment shroud extending around the perimeter of the passageway and also filled with said substrate composition;

injecting an in-mold coating onto a surface of said molded article in said mold cavity, said in-mold coating being prevented by said containment shroud from flowing completely through said passageway and into said substrate injection device; and wherein said mold cavity has a volume that remains substantially unchanged from the step of injecting a substrate composition to the step of injecting an in-mold coating.

* * * * *